Patented July 10, 1951

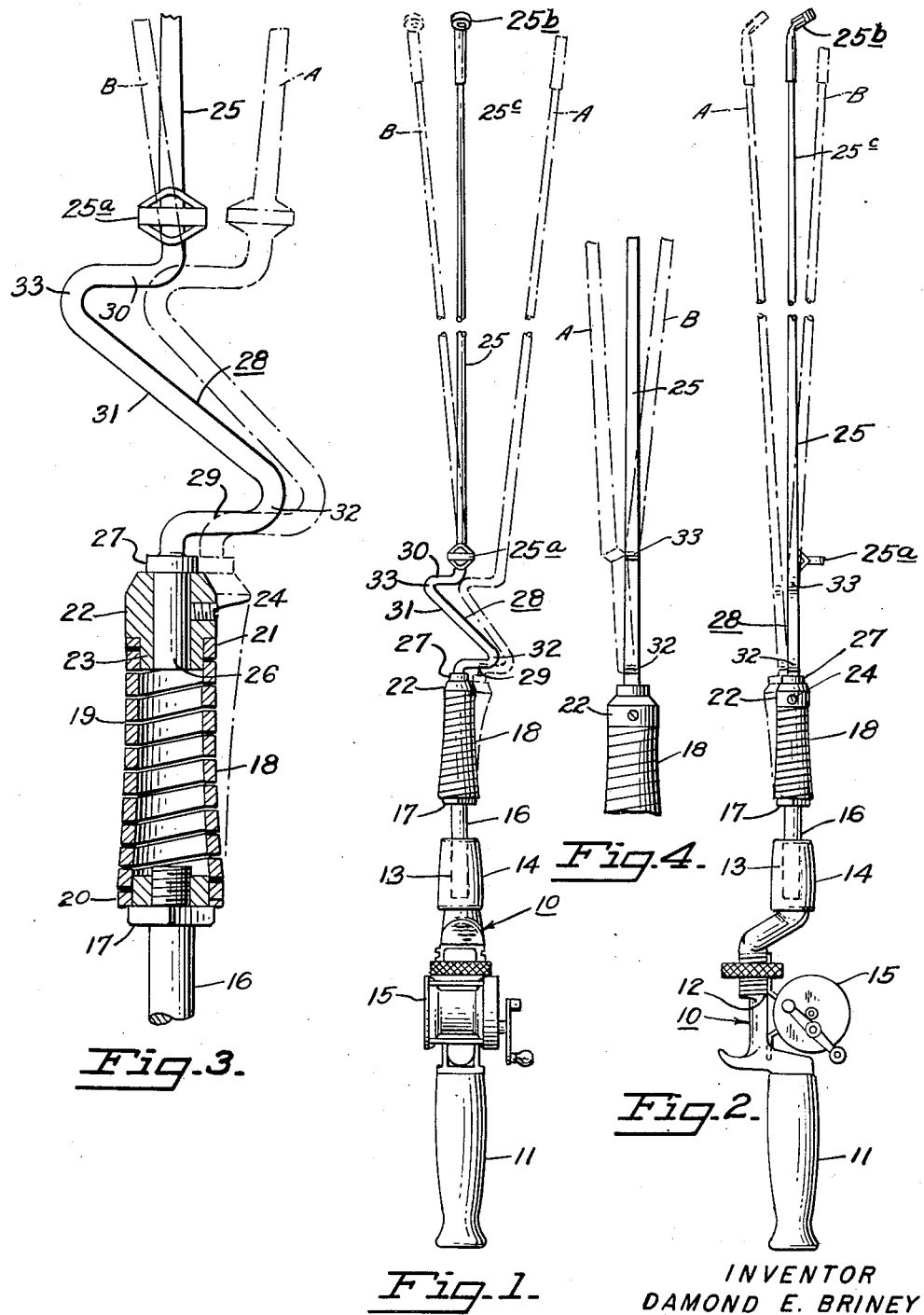

2,559,934

UNITED STATES PATENT OFFICE 2,559,934

FISHING ROD WITH INTEGRAL RESILIENT MEANS

Damond E. Briney, Natalia, Tex.

Application July 22, 1948, Serial No. 40,180

5 Claims. (Cl. 43—18)

This invention relates to fishing rods and more particularly to fishing rods particularly adapted for bait casting.

Bait casting rods have an essential difference from fly casting rods, in that the average fly is of very little weight, and consequently does not have a large amount of momentum at the free tip end of a rod induced by the arcuate swing of the end tip in the casting operation. Therefore, fly casting rods are generally very long, slender and resilient; and because the effect of the resilience cannot be predetermined it is difficult to determine with reasonable accuracy where a fly will alight upon the water. Also, long resilient rods are difficult to use under conditions met along streams which have trees and bushes lining the banks, commonly called underbrush, because the tip of the rod and the line require a considerable amount of space for manipulation. Further, if a heavier weight is imposed at the end of the tip, such as a bait in bait casting, the slenderness of a rod causes an excess vibration at the end tip which jerks the bait backward upon rebound of the tip of a slender flexible rod due to the impelled force of casting.

An object of the present invention is to provide a fishing rod in which the rod portion from the handle grip to the free end or tip is relatively short and relatively stiff as compared with the length and flexibility of the well-known fly-casting rod.

Another object is to provide auxiliary resilience in a relatively stiff bait casting rod.

A further object is to provide in a relatively stiff bait casting rod, means for permitting the rod to flex upon making a cast of bait, and for snubbing the rebound of the tip of the rod on the recoil of the thrust of casting.

With the foregoing and other objects in view, which will be apparent from or further explained in this specification, one form in which the invention may be exemplified is described herein and illustrated in the accompanying drawing, it being understood that variation by substitution of equivalents may be resorted to without departing from the scope of the invention defined in the appended claims.

In the accompanying drawing:

Fig. 1 is a plan view of the fishing rod of the invention.

Fig. 2 is a side view of the rod of Fig. 1, showing a flexed position in dotted lines.

Fig. 3 is a fragmentary enlarged view partly in section of structure shown in Fig. 1.

Fig. 4 is a fragmentary enlarged view of a portion of structure shown in Fig. 2.

Referring to the drawing in which like reference characters indicate corresponding parts in the several views, 10 indicates generally any suitable handle for mounting at the butt end of a fishing rod. Many types of handles are well known, and as herein illustrated by way of example, may consist of a terminal hand grip 11 which is employed as the grip handle for casting, an adjoining axially off-set reel seat 12, and a tubular neck 13, axially aligned with the hand grip. An auxiliary tubular forward hand grip 14 may surround the tubular neck, used more frequently as the hand grip when reeling in the line, whether with or without a fish having been caught. Obviously, the reel seat is for mounting a reel 15.

The recess of the tubular neck of the handle receives therein one end of a stub rod 16 coaxial with the hand grip members. The opposite end of the stub rod is provided with a seat 17 for supporting thereon one end of an axially elongated helically coiled spring 18 which is centrally hollow. The strip for forming the coil spring is of greater width than thickness so that in vertical section as shown in Fig. 3, the coils are elongated rectangularly, which, when coiled, are closely spaced as at 19 at the relatively opposed faces of the coils when the spring is at normal position without lateral flexing and is aligned with the rod and handle members.

The coil spring 18 is preferably of lesser diameter at its tip 21 which is connected to the butt end of the rod than at its opposite base end 20 which is connected to the seat 17. At said opposite smaller end 21 the spring mounts an axially aligned tubular nipple 22 having an extension or tubular neck 23 extending into and securely fixed in the hollow tube of the coils, the nipple having a set screw 24 through the wall thereof for securing therein the butt end of a main rod generally indicated 25.

The butt end 26 of the main rod 25 is adapted for mounting in the tube of the nipple 22 being snugly slidable into the nipple and secured therein by the set screw 24, the rod being provided with a shoulder 27 which seats on the nipple to provide a more firm base for a connection at the adjoining end of the nipple. The main rod portion is provided with any suitable number of the usual relatively spaced guide members 25a and 25b, the latter being at the tip end of the rod.

Adjacent its mounting in the spring nipple 22 the butt end portion of the main rod 25 is integrally laterally deformed from axial alignment to produce in said butt end portion closely adjacent to the spring 18 a substantial rigidity which flexes responsive to applied force of casting, but is non-flexing responsive to the rebound flexing or vibration of the tip end portion of the rod beyond the deformed member. As herein exemplified in preferred form, such deformation comprises a Z-shaped member generally indicated 28 which, when viewed from a side edge, lies substantially within one axial longitudinal plane of the rod, as shown in Fig. 2, but provides lateral offsets from the rod axis in a plan view perpendicular to the side edge, as shown in Fig. 1. The Z-shaped member comprises lateral arms 29, 30 and diagonal crossbar 31 therebetween. The arms 29 and 30 extend laterally to opposite sides of the rod axis, the ends thereof which connect the respective arms with the axial aligned portions of the rod, and also the center of the diagonal crossbar 31 of the Z-shaped member, being substantially axially aligned with the main rod portion, and with the spring and the hand grip. The lateral offset of the opposite Z arms 29, 30 is substantially equal on either side of said rod axis. The lateral arms and diagonal crossbar of the Z member are substantially rigid in the length of each such member, but the angles 32 and 33 therebetwen have a degree of flexure, though not a resilience such as exists in the lateral resilience of the spring 18, such flexure at said angles being both in the plane of the Z member by opening of said angles as in Fig. 3, and also transversely perpendicular thereto by torque at said angles.

At the end of the Z member which is more remotely removed from the spring 18 is the axial length of the major portion of the main rod 25, designated as tip portion 25c, carrying spaced guides 25a and a tip end guide 25b, the axial length of this major or tip portion of the main rod being relatively short and stiff as compared to the length and flexibility of a fly-casting rod, preferably being 2 to 3 feet in length.

It is to be noted that a purpose of the invention is to provide a short relatively stiff rod which will flex responsive to applied force of the arcuate arm movement in making a cast, but which will have its resilient rebound snubbed or absorbed so that the tip portion of the rod is brought to rest or ceases to vibrate immediately after its first return reflex from the original applied force of casting. For that purpose the deformed portion or Z member is neither absolutely rigid nor is it freely flexible. It has flexure at its angles responsive to the applied force of the throw in making a cast, but is substantially rigid responsive to the reflex or rebound of the tip portion of the rod immediately following the cast. For this reason, in making a cast with the rod, the applied force of casting is effective to flex the rod its entire length from the terminal tip of the rod through the deformed portion and into the butt portion which is engaged in the spring 18, as indicated by dash line A. But on the reflex or rebound of the rod, when no applied force is present, the quiver or vibration of the tip portion 25c ceases at its connection of the tip portion to the substantially rigid deformed member and is not transmitted to the butt portion nor to the spring 18, nor to the handgrip, as is indicated by broken lines B. Likewise when applied force is exerted on the tip by strike of a fish, the vibration is transmitted through the entire length of the rod and thus to the handle member. While it is preferred in use of the rod that casting be done so that the rod will flex in the plane of the plan view of Fig. 1, in actual practice it has been demonstrated that the Z member flexes in the same manner by torque at its angles 32 and 33 if the casting or fishing operation be carried on with the flexing of the Z member in a plane perpendicular to the plan view, as shown by broken lines in Fig. 2. The theory, which appears to be most probable at least, is that by interrupting the continuity of axial alignment of the rod portion by a deformed member, regardless of its shape, which has portions offset equally on both sides of the axis of the rod, and has flexure responsive to applied force only and not to the force of rebound quiver of the tip, causes a balanced flexure substantially evenly upon application of applied force such as in casting, and will absorb the rebound quiver of the tip evenly in the deformed member without unbalancing the rod from axial alignment or transmitting the rebound quiver to the handgrip. For a long period of experiment it has been determined that for all purposes a Z shaped interruption of the axial alignment of the main rod portion is the most effective and efficient, and it has therefore been expressed as the preferred form.

In operation, it is to be understood that in casting with a fishing rod it is well known that there is an arcuate swing of the tip end of the rod by manual manipulation at the hand grip end. This arcuate swing at the tip of the rod is a manually propelled applied force and causes a long resilient rod to flex backwardly quite extensively at the tip end, while the manual force of the throw is exerted. When the manual force of the throw ceases, the tip of the rod flexes reversely or forwardly responsive to the resilience of the flexible rod; and at the limit of its forward flexing it rebounds rearwardly due to the inherent flexibility of the rod; and there may follow several oscillations of minor flexes until the vibrations cease. At times these reflexes of the end of the rod tip occur while the bait, fly or spoon are in transit in the air. These flexes and vibrations frequently prevent the bait, spoon, or even a fly, from striking the water in an intended area, and often causes the bait, etc., to be jerked rearwardly after landing in the water.

Due to auxiliary spring means of this invention, the rod may be quite stiff and since it does not depend on the length and thickness of the rod for litheness and resilience, it may be made relatively short, so as to be adaptable to use along streams where underbrush and overhanging trees and bushes interfere with manipulation of a long resilient rod. Upon the normal throw of the arm and rod rearwardly in the initial movement of making a cast, there is practically no rearward swing of the tip end, due to the shortness and stiffness of the rod, yet when the rod is manually propelled forwardly by applied manual force of arm movement, there is sufficient flexing of the spring and the Z member to prevent the tip of the rod from coming to a sudden stop in its arc of movement, and the cast bait, spoon or even a fly, may be directed to alight upon the water lightly and more nearly at a predetermined spot. Since the rebound is not supplemented by applied manual force, the Z member which is substantially transverse to the plane of the rebound force, provides substantially no acceleration of the rebound of the rod, while the coil spring having the opposed faces of its coils closely spaced, snubs the effect of the recoil of the rod by the momentary contact of the opposed faces of the coils.

In the event of a strike by a fish the spring, and also the Z member at its angles flex proportionately to the force of pull on the tip of the rod, the rigid crossbar 31 resiliently absorbing by torque between the angles a large proportion of stress which would otherwise be transmitted solely to the coil spring whereby the Z member acts as a stabilizer of the rod during play of the line in the guides. The main rod portion 25 being short and relatively stiff, there is not the wide arc of resilient swing at the end of the rod which is prevalent in a long thin flexible rod, and which so often permits a fish to unhook itself when the line goes slack by reason of the change of direction of run of the hooked fish.

Thus a short stiff rod has been provided adaptable to use in underbrush, and wherein the oscillations at the tip of the rod are substantially eliminated, and also wherein the manual thrust which normally produces a decided rebound, is absorbed on the rebound by the Z member and the coil spring by a snubbing action thereof.

Having described the invention, what is claimed as new and patentable is:

1. In a fishing rod, a main rod portion adapted for attachment to a hand grip and reel seat at a butt end portion of the rod, and an elongated coil spring mounted axially of the rod at the butt end portion thereof, said rod having adjacent said spring and intermediate said spring and the tip end of the rod an integral portion interrupting the axial alignment of portions of the rod and offset laterally equally in opposite directions from the axis of the rod and having ends connected to adjacent coaxial spaced portions of the rod, the connected ends of said offset portion being axially aligned with the spring and major portion of the rod.

2. A fishing rod having a main rod portion provided with a tip end, a Z-shaped portion, and a butt end, a coil spring axially aligned with the main rod portion connected at one end to said butt end, and means for connecting the other end of said coil spring to a hand grip and reel seat member, said Z-shaped portion having lateral arms extending in opposite directions from the axis of the main portion of the fishing rod, and the ends of said arms being substantially axially aligned with said rod tip and butt end.

3. A fishing rod having a main rod portion provided with a tip end, a portion deformed from axial alignment with the main rod portion and extending equal distances in opposite directions from the axis of the main rod portion to provide arms terminating in ends, and a butt end, an axially elongated coil spring axially aligned with the main rod portion and connected at one end to said butt end, and means for connecting the other end of said coil spring to a hand grip and reel seat member, and said spring and the ends of the deformed portion being coaxial with the major portion of the rod.

4. The subject matter as claimed in caim 2, and said coil spring having helical coils whose opposed side faces are relatively closely spaced.

5. The subject matter as claimed in claim 3, and said coil spring being of lesser diameter at the butt end of the rod than at the hand grip and having helical coils whose opposed side faces are relatively closely spaced.

DAMOND E. BRINEY.

REFERENCES CITED

The following references are of record in the file of this patent:

UNITED STATES PATENTS

| Number | Name | Date |
| --- | --- | --- |
| 343,802 | Everett | June 15, 1886 |
| 1,513,567 | Swihart | Oct. 28, 1924 |
| 2,182,423 | Cabassa | Dec. 5, 1939 |
| 2,306,638 | Meisler | Dec. 29, 1942 |